No. 824,010. PATENTED JUNE 19, 1906.
P. M. GUNDLACH.
GRAIN DRILL.
APPLICATION FILED DEC. 8, 1905.
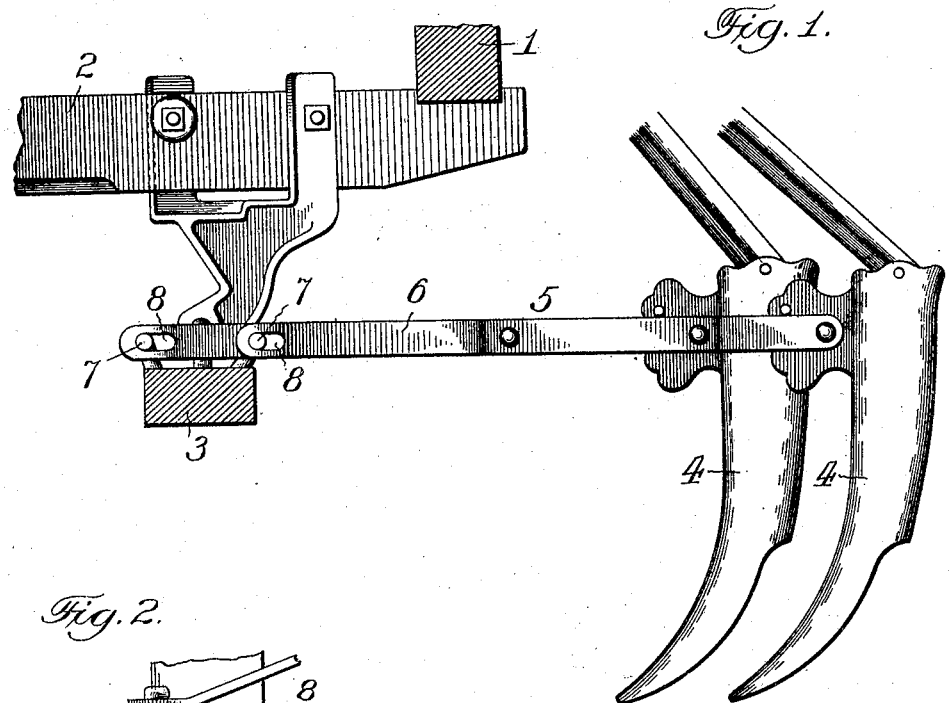
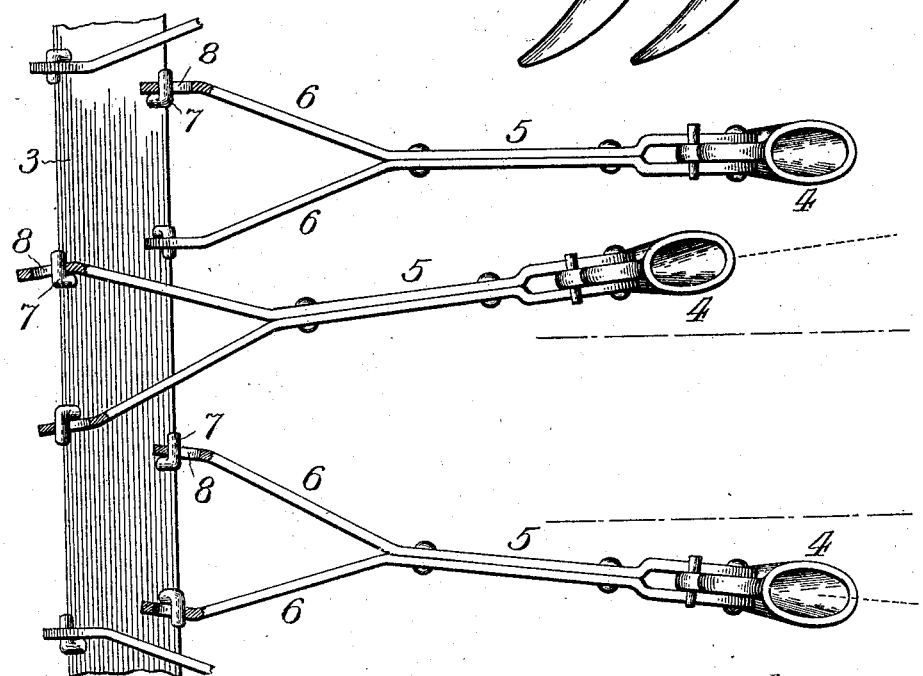
Attest:
John Enders.
M. H. Holmes.
Inventor:
Philip M. Gundlach,
by Robert Burns
Attorney

UNITED STATES PATENT OFFICE.

PHILIP M. GUNDLACH, OF BELLEVILLE, ILLINOIS.

GRAIN-DRILL.

No. 824,010. Specification of Letters Patent. Patented June 19, 1906.

Application filed December 8, 1905. Serial No. 290,918.

*To all whom it may concern:*

Be it known that I, PHILIP M. GUNDLACH, a citizen of the United States of America, and a resident of Belleville, in the county of St. Clair and State of Illinois, have invented certain new and useful Improvements in Grain-Drills, of which the following is a specification.

The present invention relates to grain-drills having a series of flukes or like grain-depositing means for depositing the grain or seed in the ground, and has for its object to provide a simple and efficient structural formation and arrangement of parts whereby the flukes or like seed-depositing means are enabled to automatically release themselves from accumulations of weeds or the like, which in the ordinary operation of a grain-drill requires a stoppage of the machine and a dislodgment of such accumulations by hand, all as will hereinafter more fully appear and be more particularly pointed out in the claims.

In the accompanying drawings illustrative of the present invention, Figure 1 is a fragmentary sectional elevation of a grain-drill; and Fig. 2 is a detail plan view of the same, illustrating the drag-bars and flukes in their normal and deflected positions.

Similar numerals of reference indicate like parts in both views.

Referring to the drawings, 1 represents the axle, 2 the tongue-frame, and 3 the drag-rail, secured to the tongue-frame in any usual manner.

4 represents the drill-flukes or other like seed-despositing means and arranged in a row at the rear side of the drill, as usual.

5 represents the drag-bars, connected at their rear ends to the flukes in the usual manner and forked at their forward ends to form separated attaching members 6 for engagement with individual attaching hooks or staples 7 on the drag-rail 3 aforesaid.

The present invention involves in a broad sense an attachment of the drag-bars 5 to the drag-rail 3 in a manner which admits of a lateral horizontal movement of their rear ends and of the flukes or like seed-depositing means carried by said drag-bar and so that when the ordinary and normal space between a pair of the flukes becomes clogged up with an accumulation of weeds or the like the said flukes will spread apart automatically under the undue stress set up by such accumulations to allow said accumulations to pass between the flukes, after which the flukes will return automatically to the normal position. In the accompanying drawings I illustrate my preferred arrangement for effecting the above-described operation, and which consists in forming the attaching-eyes 8 at the forward ends of the forked members 6 of the drag-bars 5 of an elongated form, as shown.

Other equivalent means may be employed without departing from the scope of the pres-invention, and among which may be mentioned enlarged eyes instead of the elongated eyes shown in the drawings.

Having thus fully described my said invention, what I claim as new, and desire to secure by Letters Patent, is—

1. The combination of a grain-drill frame, a drag-rail, a series of seed-depositing means, a series of drag-bars connecting the series of seed-depositing means to the drag-rail, and an attachment for the drag-bars to the drag-rail affording lateral horizontal movement to the seed-depositing means, substantially as set forth.

2. The combination of a grain-drill frame, a drag-rail, a series of seed-depositing means, a series of drag-bars connecting the series of such depositing means to the drag-rail, and an attachment for the drag-bars to the drag-rail affording lateral horizontal movement to the seed-depositing means, the same comprising attaching-staples on the drag-rail and elongated eyes in the forward ends of the drag-bars, substantially as set forth.

3. The combination of a grain-drill frame, a drag-rail, a series of seed-depositing flukes, a series of drag-bars connecting said flukes to the drag-rail, and an attachment for the drag-bars to the drag-rail affording lateral horizontal movement to the flukes, substantially as set forth.

4. The combination of a grain-drill frame, a drag-rail, a series of seed-depositing-flukes, a series of drag-bars connecting said flukes to the drag-rail, and an attachment for the drag-bars to the drag-rail affording lateral horizontal movement to the flukes, the same comprising attaching-staples on the drag-rail and elongated eyes in the forward ends of the drag-bars, substantially as set forth.

Signed at Belleville, Illinois, this 27th day of November, 1905.

PHILIP M. GUNDLACH.

Witnesses:
GUSTAV NEUMANN,
SEVERN POIRAT.